United States Patent [19]

Smith

[11] 3,855,126

[45] Dec. 17, 1974

[54] CONTINUOUS INCREMENTAL FEED FILTRATION PROCESS AND APPARATUS

[76] Inventor: Graydon Smith, 57 Lexington Rd., Concord, Mass. 01742

[22] Filed: Aug. 14, 1972

[21] Appl. No.: 280,680

[52] U.S. Cl. .................... 210/77, 210/90, 210/387, 210/499
[51] Int. Cl. ............................................ B01d 33/04
[58] Field of Search ....... 210/77, 90, 387, 400, 401, 210/446, 184, 455, 499

[56] References Cited
UNITED STATES PATENTS

| | | | |
|---|---|---|---|
| 3,672,507 | 6/1972 | Paull | 210/77 |
| 3,471,017 | 10/1969 | Kalman | 210/71 |
| 3,645,399 | 2/1972 | Kalman | 210/77 |

Primary Examiner—Frank A. Spear, Jr.
Assistant Examiner—Ivars Cintins
Attorney, Agent, or Firm—Curtis, Morris & Safford

[57] ABSTRACT

A process and apparatus for continuously filtering a flowable material such as a heat-softened plastic material by incrementally moving a band or ribbon of a filter medium across the path of the softened plastic material. The band of filter material is preferably in a roll and stored in a cassette and is fed from the cassette through an inlet port in, for example, a plastic extrusion apparatus and is directed across a supporting breaker plate in the path of the plastic material as it flows through the extruding apparatus. The filter is then directed through an outlet port where it is sheared and discarded. When the necessity for changing the filter screen is sensed, a filter band feed mechanism is actuated to incrementally move the filter material through the extrusion apparatus and that portion of the filter medium passing out of the outlet port of the extrusion apparatus is sheared off by a shearing mechanism mounted adjacent the outlet port. The extrusion operation may be continuously carried out during the incremental movement of the filter screen and the feed mechanism and the shearing mechanism act to seal the inlet port and outlet port, respectively, during the extrusion operation.

14 Claims, 12 Drawing Figures

CONTINUOUS INCREMENTAL FEED FILTRATION PROCESS AND APPARATUS

The present invention relates to a process and apparatus for filtering a flowable material such as heat-softened plastic material where the material is caused to flow through a filter medium such as a filter screen and more particularly relates to a process and apparatus for continuously filtering the material while allowing for incremental changes of the filter screen through the apparatus.

In continuous operations such as plastics extrusion, fiber spinning or chemical processing where a mass of heat-softened material is worked it is essential that contaminants in the materials be removed or filtered out prior to final processing.

The removal of undesired contaminants should be carried out in such a manner so as not to interfere or interrupt the production process. Inasmuch as the screening media becomes clogged and obstructed after a certain amount of use, it is necessary to change the screen and it is in the screen changing process that delays and interruptions in the production process are common.

A continuous filtering process and apparatus is disclosed in U.S. Pat. No. 3,471,017. This patent teaches that a filter band or ribbon may be passed through inlet and outlet ports in a filtering apparatus across the path of material flow and that an adequate seal may be maintained at the inlet and outlet ports by carefully maintaining a solidified plug of the material within the ports as a sealant. A difference in size between the inlet plug and outlet plug is also relied upon to advance the filter band through the apparatus. Such a solution, while better than prior art filter screen changers which require shut down of the process line to effect a filter screen change, has not been found to be satisfactory because it is difficult to advance the filter band through the apparatus and the reliance on the plugs of solidified material has not proven to be effective. To insure a complete seal the plugs must be cooled sufficiently to form a relatively solid mass which tends to bind in the inlet and outlet ports thus making filter screen changing difficult. If the plugs are formed in a less solid state, undesirable leakage of material occurs. Also, some materials do not exhibit an ability to form an adequate solidified plug.

An additional drawback to the apparatus disclosed in the aforesaid patent is that the high pressures associated with an extrusion process force the filter band to dimple into the access holes of the back-up or breaker plate supporting the filter band which also tends to make it extremely difficult to change the position of the filter band.

Accordingly, it is an object of the present invention to provide a process and apparatus to permit periodic changing of a filter screen medium in a process where a heat-softened material is worked which eliminates interruption or delay in the working process.

It is a further object of the present invention to provide a process and apparatus wherein a filter screen medium in the form of a band or ribbon to screen out impurities in a heat-softened material may be incrementally changed during a continuous working process on the heat-softened material.

A further object of the present invention is to provide a unique breaker plate assembly for use in a continuous filtering apparatus which eliminates the tendency of the filter screen to dimple into the access holes of a breaker plate thereby making screen changes difficult.

A still further object of the present invention is to provide a process and apparatus to incrementally change the transverse position of a screen or filter band without interrupting the processing of the material being filtered by incrementally shifting the filter band or screen during the working process.

Yet another object of the present invention is to provide a filtering process and apparatus employing means to advance a filter band through a processing apparatus and providing a shear mechanism to cut off that portion of the filter band exiting from the processing apparatus wherein the advancing mechanism and the shearing mechanism cooperate to provide a positive seal to preclude leakage of the processed material.

In accordance with the preferred embodiment of the present invention, the continuous incremental feed screen changer is shown in conjunction with an extrusion apparatus utilized to extrude a heat-softened material such as plastic or the like. A filter screen in the form of a band or ribbon of square mesh wire cloth or the like is directed through inlet and outlet ports in a path transverse to the flow direction for the heat-softened material being extruded. In the apparatus, the material itself is heated to a flowable state and forced under considerable pressure through the filter band so that any impurities in the material are captured by the filter material. As the filter strains impurities from the heat-softened material, it becomes progressively clogged necessitating a change so that fresh filter screen area may be brought into the flow path of the material. The present invention provides a filter band feed mechanism which incrementally feeds a predetermined length of the filter band into the extrusion apparatus and a shear mechanism at the filter band outlet port to shear off the length of the filter band containing the entrapped contaminants ejected from the extrusion apparatus. During that portion of the cycle when the filter band is not being changed the filter feed mechanism and the shear mechanism coact to provide blocking gates at the inlet port and outlet port to positively seal these ports and prevent leakage.

Further objects and advantages of the present invention will be more readily apparent after consideration of the following specification in conjunction with the accompanying drawings, wherein.

Figure 1:
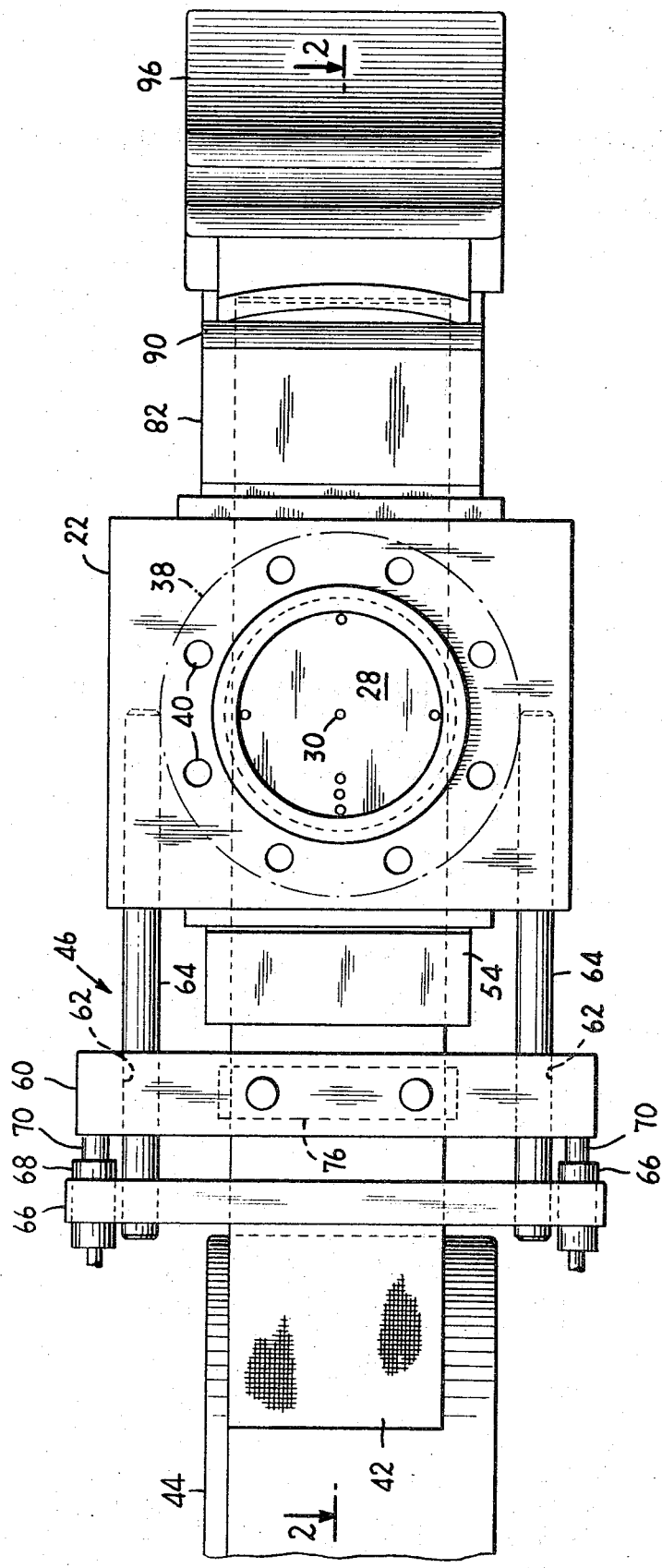
FIG. 1 is an elevational view showing the filter screen within an extrusion apparatus with the filter advancing means mounted at one side of the extrusion apparatus and the shear mechanism mounted at the other.
Figure 2:
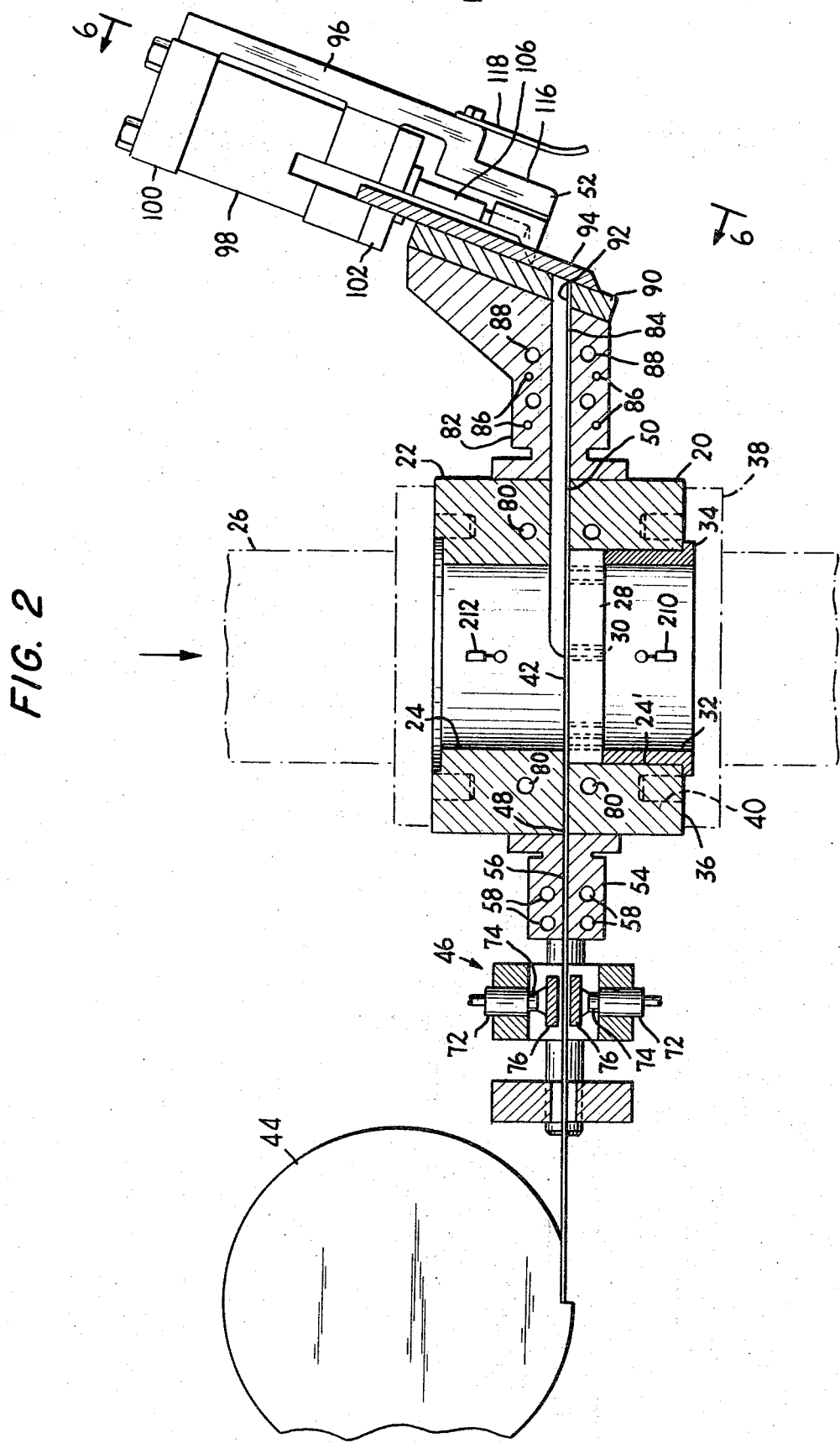
FIG. 2 is a sectional view taken on the line 2—2 of FIG. 1.

With reference to the drawings and particularly FIGS. 1 and 2, there is shown the discharge end 20 of an extrusion apparatus including a housing 22 defining a bore 24 through which a heat-softenable material, such as plastic, is forced under high pressure. Illustratively, the present invention will be described as utilized in an extrusion process but it is to be expressly understood that the filter process and apparatus of the present invention may be used in any operation where it is desired to screen contaminants from a flowable material such as a heat-softenable plastic material.

As viewed in FIG. 2, the heat-softenable material flows into bore 24 in housing 22 from casing 26 in which may be deployed a screw (not shown) of any suitable construction to direct the heat-softenable material under pressure into bore 24 within housing 22.

Secured within bore 24 in housing 22 is a back-up or breaker plate 28 (see FIG. 8) which is provided with a plurality of through holes 30 therein arranged in a unique manner as will be described more fully hereinbelow. The bore 24' in the outermost segment of housing 22 is of a greater diameter than bore 24 in the innermost segment of the housing and the breaker plate 28 abuts against the shoulder formed by the enlargement of bore 24 to the bore 24'. A sleeve member 32 retains the breaker plate 28 firmly against the abutting shoulder and the sleeve member 32 includes an outer flange member 34 which bears against the outer face 36 of the housing 22. A retaining ring 38 fits over the sleeve 32 and is suitably bolted by a plurality of circumferentially spaced bolts 40 to the housing 22 to retain the sleeve and the breaker plate 28 securely in place.

Contaminants are removed from the heat-softened material be a filter or screen 42 and the filter material may be selected from a wide range of filter media such as square mesh wire cloth in carbon or stainless steel, bronze, brass, copper, monel or nickle and even woven wire screens and custom laminates of sintered stainless steel fibers to remove contaminants down to 0.3 microns in size may be used. According to the present invention, the filter screen 42 is in the form of a band or ribbon of substantial length and is unwound from a coil in a casette 44 by a feeder mechanism 46 and is fed through an inlet port 48 in housing 22 against a breaker plate 28 across the path of the heat-softened material being extruded and out an exit port 50 in housing 22. Thus, the filter band 42 screens contaminants from the material within housing 22 and the material which flows out of housing 22 is free of contaminants. The contaminants eventually clog the pores of the filter band 42 necessitating a change of filter material to being a fresh zone on the filter material into bore 24. Preferably, the inlet port 48 and outlet port 50 are coated with a low friction coating such as Teflon to facilitate screen changing without binding.

The filter screen 42 is thus changed without interruption in the extrusion process by incrementally feeding a predetermined length of the filter screen band 42 from the casette 44 and ejecting a similar length of contaminated screen from the extruder to be sheared off by the shear mechanism 52.

The inlet port 48 for the filter band 42 is preferably rectangular in cross-section and dimensioned to accommodate the filter band 42 readily without interfering with the free passage of the band into bore 24. An inlet housing 54 including a rectangularly shaped passage 56 therein to accommodate filter band 42 is mounted in fluid tight relationship on the exterior of housing 22. The housing 54 includes fluid access passages 58 therethrough through which heated liquid may be circulated to heat the housing 54 when desired to control the viscosity of the plug of heat-softenable material which inherently forms on the surface and within the pores of the filter band 42.

The feeder mechanism 46 includes a slide assembly 60 provided with through bores 62 at its top and bottom (see FIG. 1) adapted to slidably receive guide rods 64 extending from the housing 22. A fixed support member 66 secured to the free ends of the rods 64 support reciprocating members 68, which may be pneumatic or hydraulic cylinders, having a reciprocating piston member 70 fixed to the slide 60. Thus, actuation of the cylinder 68 from a suitable source of air or hydraulic fluid under pressure (not shown) reciprocally moves the slide 60 from a first position removed from housing 54 to a second position closely abutting the housing Carried by the slide assembly 60 are a pair of opposed pneumatic or hydraulic cylinders 72 each having an extendable piston member 74 to which is secured filter band contact shoes 76. The filter contact shoes or gripping shoes 76 contact each side of the filter band 42 along the full extent of the lateral width of the filter band and, when the cylinders 72 are actuated, piston members 74 extend and contact shoes 76 grip the filter band 42 therebetween. With the contact shoes 76 in intimate contact with the filter band 42, actuation of the cylinders 68 to extend piston members 70 advances a fresh increment of the filter band 42 into the extrusion apparatus.

After a predetermined length of the filter band 42 has been advanced into the extrusion apparatus, the shoes 76 are maintained in contact with the filter band 42 and piston members 70 of the cylinders 68 are maintained in the extended position so that the filter band contact shoes 76 acts as a blocking gate to assist in blocking the filter band access passage 56 in the inlet housing 54 to preclude leakage of the heat-softened material being extruded.

The filter band exit port 50 within housing 22 is similarly rectangularly shaped but has a larger cross-sectional area than the area of the inlet port 48 to accommodate a build up on the filter band 42 of impregnated contaminants and a solidified plug of the material being extruded within which the contaminants are captured. Inasmuch as some material being processed within the extruder housing 22 is heat-softenable, and is maintained during the extrusion process at an elevated temperature so it can flow through the extrusion process, the material readily solidifies upon being cooled. Accordingly, provision is made at the outlet port, and the inlet port as well, to control the temperature of the material in the inlet and outlet ports to form a solidified plug of the material to assist in forming a seal to preclude leakage of the material out the filter band inlet and outlet ports. Thus, housing 22 is provided with fluid passages 80 adjacent the inlet and outlet ports 48 and 50, respectively, through which cooling fluid may be circulated to cool the walls of the housing 22 adjacent the ports to assist in the formation of solidified plugs of the material being processed.

An outlet housing 82 is mounted in fluid tight relationship on the exterior of housing 22 and includes a rectangularly shaped passage 84 therein to accommodate filter band 42 and the entrapped contaminants and plug of material. The filter band outlet passage 50 is in register with the passage 84 in the housing 82. The housing 82 also includes fluid access passages 86 therethrough for the circulation of cooling fluid within the passages 86 to maintain the plug of heat-softenable material within the passage 84 in a solidified state. When it is desired to shift the filter band for a screen changing operation, it may be desired to heat the exposed surfaces of the plug in order to facilitate movement of the screen and plug out of passage 84 and, accordingly, additional fluid passages 88 are provided for circulation of a heated fluid to heat the surfaces of the passage 84 in contact with the plug of heat-softenable material within passage 84 to facilitate outward movement of the filter band and the associated plug of contaminant and material. The Teflon coating of the port also insures ease of movement of the filter screen and the associated plug of contaminant and material.

After the predetermined length of filter band has been passed out of the passage 84 in housing 82 the shear mechanism 52 is actuated to cut the length of filter band and associated plug of material and contaminants. Shear mechanism 52 includes a mounting plate 90 mounted to the outer face of housing 82 which is disposed at an angle with respect to the outer surface of housing 22 of the extruder to allow sufficient clearance for the knife actuating assembly. The mounting plate 90 includes an access passage 92 therein to accommodate the filter band 42 and the associated plug of contaminant and material. A retractable knife blade 94 is slidably disposed along the surface of plate 90 and may be retracted to clear the passage 92 to allow for the predetermined length of the filter band to be extended and is then actuated by hydraulic or pneumatic means to shear the plug and band and, as shown in FIG. 2, to act as a blocking gate to positively seal the filter band outlet passage from the extrusion apparatus.

Figure 6:
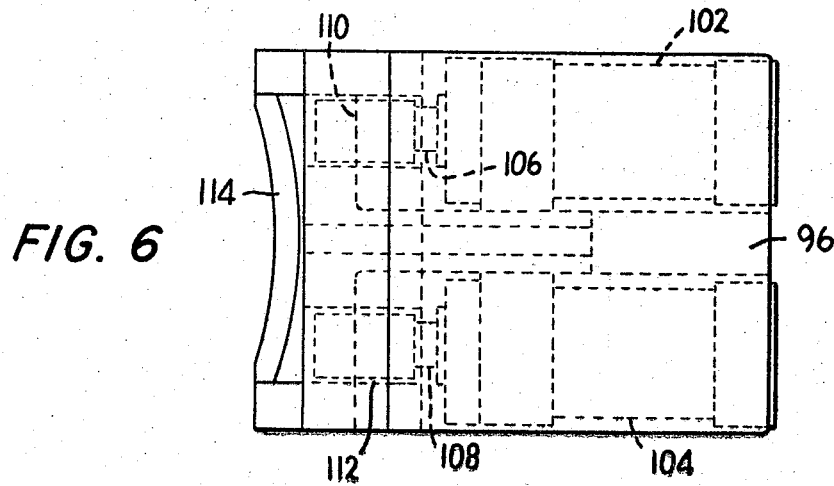
FIG. 6 is a plan view showing the shear mechanism taken on the line 6—6 of FIG. 2.

Shear mechanism 52 includes a support bracket 96 secured to plate 90 and support legs 98 and 100 extending from bracket plate 96 to securely mount a pair of hydraulically or pneumatically actuated cylinders 102 and 104 (see FIG. 6 as well). The extensible piston members 106 and 108, respectively, of cylinders 102 and 104 are secured within mounting blocks 110 and 112, respectively, which are in turn rigidly secured to the upper surface of the knife member 94. As seen in FIGS. 1 and 6, the knife edge 114 of knife 94 is arcuately shaped and angled back to provide an effective and efficient shearing surface to contact the extended filter band and plug of materials with the contaminants embedded therein. Because of the configuration of the knife surface a smooth shearing action rather than a chopping action is imparted which effectively and efficiently shears the filter band. The sliding action of the knife 94 on the plate 90 is responsive to the simultaneous actuation of the cylinders 102 and 104 so that the knife blade 94 reciprocates responsive to the respective cylinders.

Support bracket 96 is offset as at 116 and a stop plate 118 may be secured to bracket 96 to provide an end stop for the filter band segment removed from the extrusion apparatus during a filter screen change sequence.

Figure 3:
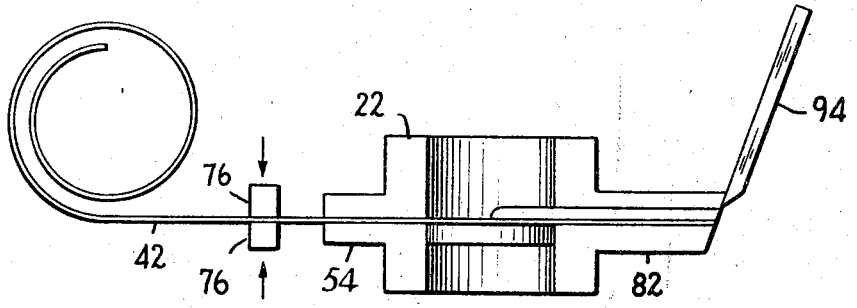
FIGS. 3, 4 and 5 are diagrammatic representations of the sequence of operation of the filter screen advancing and shear mechanisms.
Figure 4:
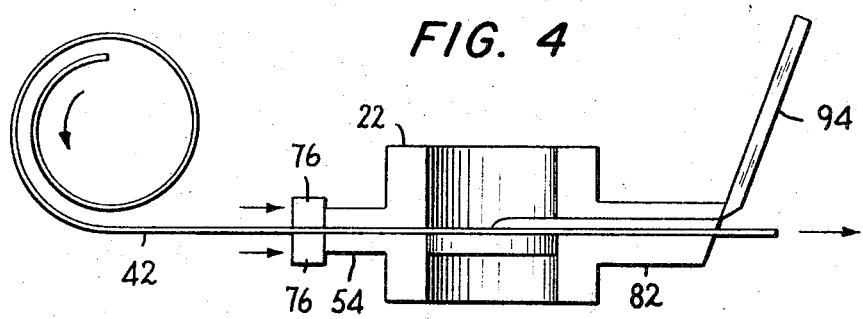
Figure 5:
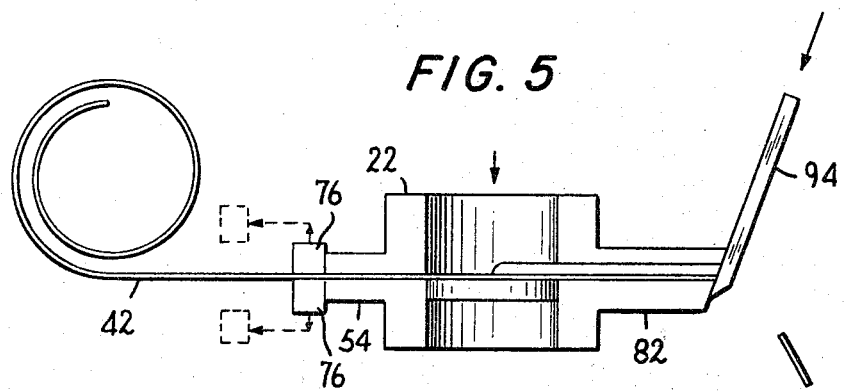

FIGS. 3, 4 and 5 depict diagrammatically a sequence of operation to shift a fresh zone of the filter band 42 into the bore 24 in housing 22. FIG. 3 shows the position of the mechanism just prior to movement of a new portion of the filter band through the apparatus. Knife blade 94 has been retracted so that the exit port from the apparatus is open, the filter band contact shoes 76 have been retracted away from the inlet housing 54 and are in contact with the filter band 42 in preparation to shift laterally responsive to cylinders 68. In FIG. 4 the contact shoes 76 have been moved in an abutting position to the inlet housing 54 and a segment of the filter band 42 with the entrapped contaminants within the plug of material has been discharged from the outlet housing 82. FIG. 5 shows the extended segment of the filter band falling away from the apparatus after being sheared as knife member 94 is moved responsive to the actuation of cylinders 102 and 104. The knife member 94 is now retained in its extended position to provide a blocking gate to the filter band outlet passage and assists in positively sealing the outlet passage. The filter band gripping shoes 76 are also maintained in a contacting position abutting the inlet housing 54 to provide a positive seal for the filter band inlet passage. FIG. 5 also shows, in broken line, the path of movement for retraction of the gripping shoes 76 and their movement rearwardly when a new section of the filter band is to be introduced into the extrusion apparatus.

Figure 7:
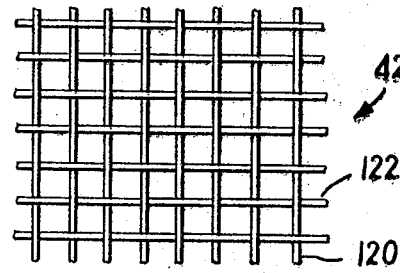
FIG. 7 is an enlarged detail representating a woven filter screen.
Figure 8:
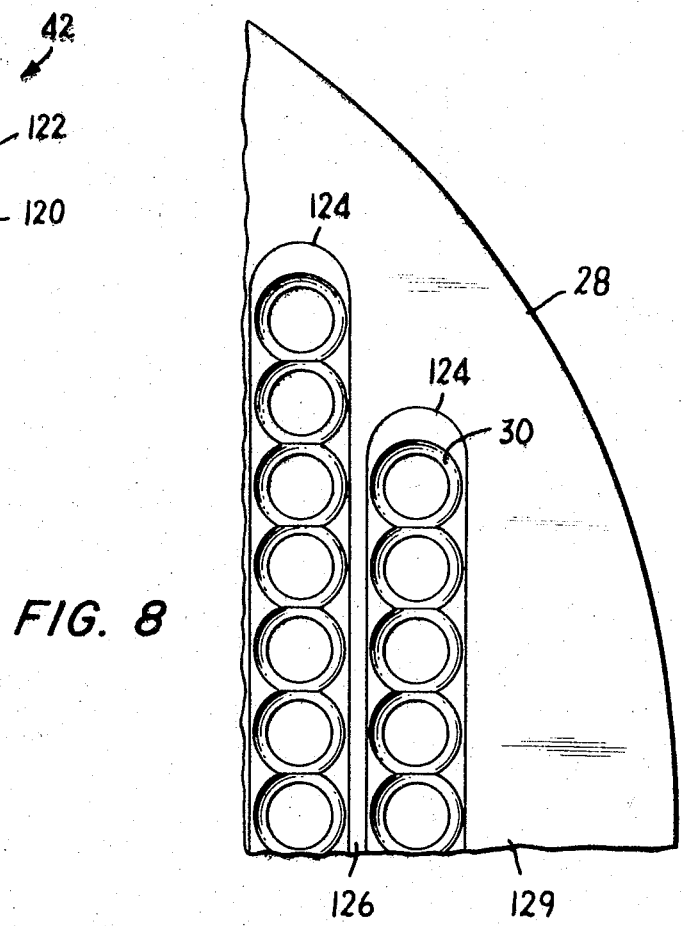
FIG. 8 is an enlarged detail of the back-up or breaker plate against which the filter screen rides in the extrusion apparatus.
Figure 9:
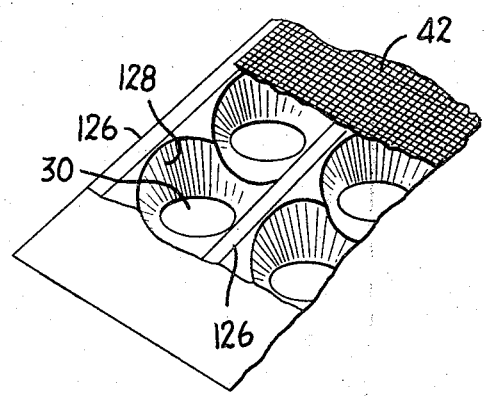
FIG. 9 is an enlarged fragmentary perspective view showing a portion of the filter screen and breaker plate.

Reference is now made to FIGS. 7, 8 and 9 for a discussion of the cooperation between the filter band 42 and the back-up or breaker plate 28. In FIG. 7 lateral strands 120 and longitudinal strands 122 are representative of a woven metallic filter band which may be utilized as filter media in the process and apparatus of the present invention. As pointed out above, a wide variety of materials and filter configurations may be utilized and the selection of a particular material and weave configuration is dependent upon the type of contaminant which it is desired to filter out of the heat-softened material being processed.

In any event, where the present invention is utilized in an extrusion apparatus the filter media in the apparatus will be subjected to high internal pressures on the order of 2,000 to 10,000 p.s.i. Pressures of this magnitude create a pressure drop across the filter band and breaker plate on the order of 100 to 5,000 p.s.i. which tend to cause the filter band to dimple into the holes in a back-up or breaker plate of standard configuration. Because the present invention contemplates a change of the filter screen media during continuous operation of the extrusion process such as a deleterious effect would make changing of the filter screen exceedingly difficult. Accordingly, another aspect of the present invention is to provide a back-up plate 28 which minimizes the propensity of filter band 42 to dimple into the holes 30 in the breaker plate.

As seen in FIGS. 8 and 9, breaker plate 28 is provided with a plurality of through holes 30 through which the heat-softened material is forced after flowing through the filter band 42 where contaminants are removed. The access holes 30 are arranged in a plurality of horizontal rows 124, i.e., offset 90° to the representation shown in FIG. 8, with each row 124 being separated by a horizontally disposed flat surface or rail 126.

The rails 126 provide a surface across which the filter band 42 may slide and precludes complete indentation or dimpling of the filter band 42 into the access holes 30 due to the high internal pressure. Additionally, the access holes 30 are formed with a countersink 128, see FIG. 9, so that the circular segment of the access hole 30 immediately adjacent filter band 42 is below the contact surface of the rails 126 with the filter band 42. With this construction the only surface of the breaker plate 28 in contact with the filter band 42 is the relatively smooth surface of the rails 126 and the flat peripheral surface 129 of the breaker plate.

While a specific embodiment for breaker plate 28 is illustrated which is machined from solid stock by first milling horizontal grooves to form the rows 124 and rails 126 therebetween, drilling through holes 30 and countersinking the holes, as at 128, it is to be understood that alternate constructions for the breaker plate can be provided using other manufacturing techniques. Breaker plate 28 can also be prepared from an investment casting or by sintering to provide support rails for the filter band and the access holes.

Figure 10:
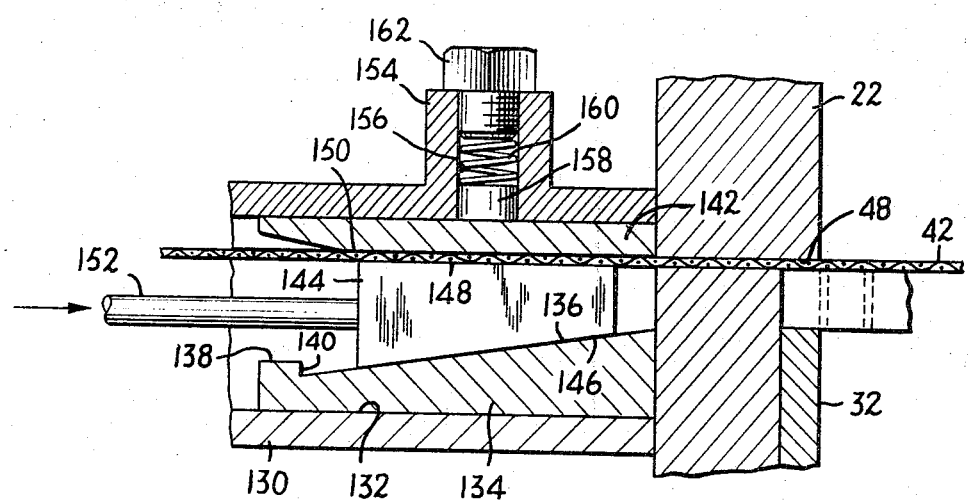
FIG. 10 is a sectional view showing an alternate construction for the advancing mechanism.
Figure 11:
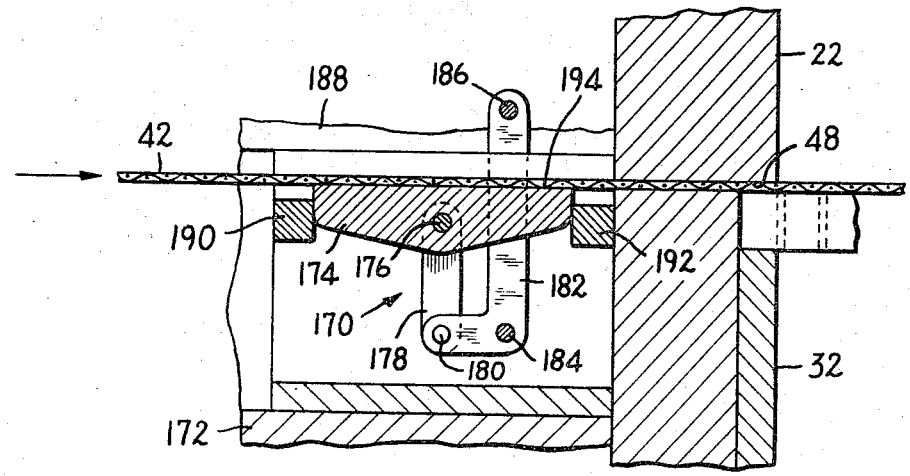
FIG. 11 is a sectional view showing still another embodiment for the advancing mechanism.

Reference is now made to FIGS. 10 and 11 wherein alternate embodiments for the filter band feed mechanism are shown. In FIG. 10 the filter band inlet housing 130 is provided with a chamber 132 therein. A guide block 134 is secured against one vertical wall of the housing 130 and is provided with an inclined surface 136 terminating in a lip 138 which forms an abutment shoulder 140. A guide plate 142 is positioned against the opposite vertical wall of the housing 130 and a wedge block 144 having an inclined surface 146 complimentary to the incline surface 136 is disposed within the chamber 132.

The filter band 42 is positioned between a flat surface 148 of wedge block 144 and the flat bearing surface 150 of the guide plate 142. A rod 152 extends from the rear of the wedge block 144 and is operably connected to the working piston member of a hydraulic or pneumatic cylinder (not shown) so that the rod 152 extends or retracts responsive to actuation of the cylinder.

When rod 152 is retracted, wedge block 144 retracts to the left, as viewed in FIG. 10, while the filter band 42 remains in a stationary position. When rod 152 is extended, i.e., when the associated cylinder is actuated, the wedge block moves to the right riding up the inclined surface 136 and by a wedging action gripping the filter band 42 and moving it laterally to the right.

To insure that the wedge block 144 releases the screen, it may be desirable to add a spring biasing force and accordingly a boss 154 having a through bore 156 therein may be provided. A plug member 158 is slidably disposed within the bore 156 and a compression spring 160 is provided to act against the plug 158 and the end of a securing bolt 162. Thus, the spring 160 urges the plug into the chamber 132 in housing 130 tending to displace the guide plate 142 so that when the wedge block is moved to the rear against the stop 140 the spring 160 urges the guide plate 142 inwardly to break the bond between the filter band 42 and the wedge block 144.

FIG. 11 shows an alternative construction wherein a linkage assembly 170 within a filter band inlet housing 172 provides the wedging and advancing action for the filter band 42. In this embodiment a filter band contact shoe 174 is pivotably secured as at 176 to a linkage arm 178 with the linkage arm 178 being pivotably secured at its other end, as at 180, to one leg of an L-shaped linkage arm 182. The L-shaped linkage arm 182 is rotatably fixed to a pivot shaft 184. The other leg of L-shaped linkage 182 is pivotably secured as at 186 to a linkage 188 which is operatively connected to the working piston member of an air or hydraulic cylinder (not shown). Guide rods 190 and 192 are provided within the housing 172 to guide the filter band contact shoe into position.

When the linkage 188 is retracted responsive to actuation of the associated cylinder, contact shoe 174 pivots away from engagement with the filter band 42 and when the linkage arm 188 is extended by its associated cylinder, the contact shoe 174 pivots back into contact with the filter band 42 with the innermost contact surface 194 of the contacting shoe surface coming into contact with the filter band 42 first at a position more outwardly displaced from the "at rest" position shown in FIG. 11. Continued extension of linkage 188 pivots the contacting shoe 174 into its final position, as shown, dictated by the guide bars 190 and 192 so that the filter band 42 is advanced a predetermined amount until the contact shoe 174 is fully seated against the surface of the filter band 42.

Figure 12:
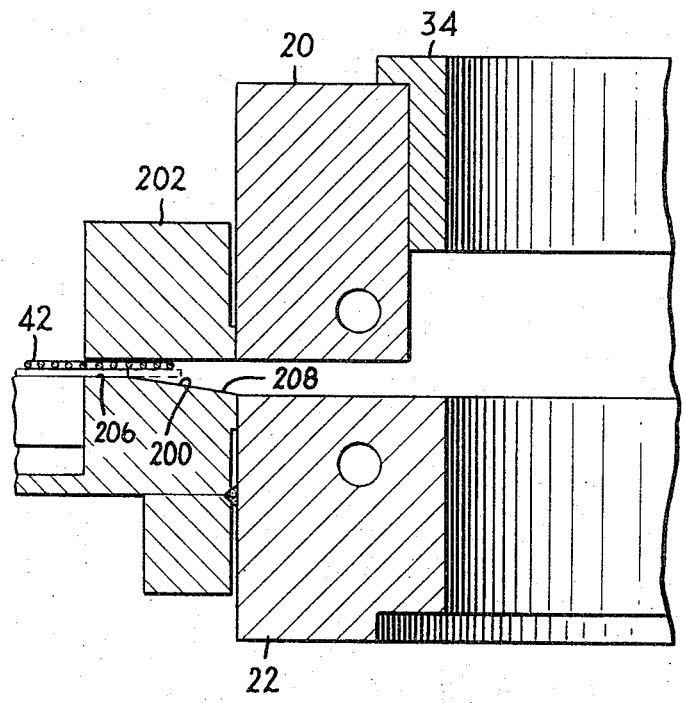
FIG. 12 is a sectional view of an alternate construction for the filter screen inlet port.

In FIG. 12 an alternate construction for the inlet port is illustrated. In this embodiment, the inlet port 200 in inlet housing 202 is tapered from a narrow initial opening at 206 to a wider opening 208 into the inlet port 48' of housing 22'. This provides a reverse taper in the direction of movement of the filter band 42 so that a tapered plug of material is formed in inlet port 200. The plug formed provides some measure of sealing due to solidification within the port and because of the direction of the taper the plug is readily displaced into the extruder housing when the filter band is shifted laterally. The material forming the plug as it contacts material at elevated temperature within the extruder housing melts readily and is processed through the filter screen.

The tapered inlet port as shown in FIG. 12 can be used with any of the advancing mechanisms shown in FIGS. 2, 10 and 11, if desired.

The sequence for shifting the filter band 42 can be initiated manually, whenever a change of filter band is sensed, at a fixed predetermined time interval which may be selected from past experience in filtering a particular material through a filter band or by sensing the pressure drop across the filter band.

Inasmuch as the pressure drop across the filter band and breaker plate is a function of the ability of the material to flow through the filter band, a build up of screened out contaminants embedded in the filter band will increase the pressure drop across the filter band. Hence, as seen in FIG. 2, pressure sensors 210 and 212 may be provided downstream and upstream, respectively, of the filter band 42 to sense the change in pressure drop across the filter band. After a predetermined pressure drop has been sensed, the filter band shifting sequence is initiated. Alternatively, only a downstream pressure sensor 210 may be used to initiate screen changing when an appropriate downstream pressure condition is sensed which indicates a screen change is necessary.

Additionally, the stop 116 on the shear mechanism 52 can be utilized as a switch to activate the knife 94 to shear off the ejected portion of the filter band when the filter band contacts the stop 116.

It is thus seen that the present invention provides a unique continuous incremental feed filtration process and apparatus wherein discrete lengths of a fresh filter medium in the form of a band is changed during continuous operation of a filtration process is conducted at a high temperature sufficient to soften the material so it can be worked and at elevated pressure ranges. After the filter band has been advanced into the processing apparatus, that length of the filter band which has been removed from the apparatus is sheared by a shearing mechanism. Both the advancing mechanism for the filter band and the shearing mechanism provide positive sealing at the filter band inlet and outlet ports to the processing apparatus. In addition, temperature controlling means are provided in the apparatus to control the formation of a solidified plug of the material being processed to assist in the sealing of the filter band inlet and outlet ports. This temperature control since positive sealing means are provided. Preferably the plugs are maintained in a cohesive condition to preclude bonding in the inlet and outlet ports.

While the essential features of the invention have been described hereinabove, it is to be expressly understood that suitable electronic or hydraulic control circuits to dictate actuation of the various hydraulic or pneumatic cylinders are employed when a filter band changing sequence is to be initiated but such control circuitry forms no part of the present invention and is considered to be within the realm of one of ordinary skill in the art.

What is claimed is:

1. An apparatus to filter contaminants from a heat-softened material comprising,
a housing,
said housing including a passage therethrough through which said heat-softened material is forced to flow,
said housing provided with opposed inlet and outlet ports flanking said passage,
a filtering medium comprising a filter screen in the form of a band of substantial length,
said filter band being disposed through said inlet and outlet ports across said passage whereby said material flowing through said passage is forced to flow through said filter screen thereby to filter out contaminants from said material,
means cooperably disposed near said inlet port to selectively grip and advance a predetermined length of said filter band into said housing to introduce a fresh section of said filter screen within said passage,
said means to grip and advance said filter band into said housing including means to positively seal said inlet port after said filter band has been advanced to preclude leakage of said material from said apparatus, and
means to positively seal said outlet port after said filter band has been advanced to preclude leakage of said material from said apparatus.

2. Apparatus as defined in claim 1 including means cooperably disposed near said outlet port to sever the length of said filter band exiting from said outlet port after said predetermined length of said filter band has been advanced into said housing.

3. Apparatus as defined in claim 2 wherein said means to sever said length of filter band includes means to positively seal said outlet port after said length of filter band has been advanced and severed.

4. Apparatus as defined in claim 3 wherein said means to sever said length of filter band exiting from said outlet port includes a slidably mounted knife member having a knife edge adapted to reciprocate across said outlet port and means to reciprocate said knife member from a first position wherein said knife edge is on one side of said outlet port to a second position wherein said knife edge is on the other side of said outlet port thereby to sever said length of filter band extending beyond said outlet port.

5. Apparatus as defined in claim 4 wherein said knife member includes a surface area thereon which effectively seals said outlet port when said knife member is maintained in said second position.

6. Apparatus as defined in claim 4 wherein said knife member reciprocates along a path which is angularly disposed with respect to a plane normal to the path of movement of said filter band exiting from said outlet port.

7. Apparatus as defined in claim 6 wherein said knife edge is arcuately shaped and angled back from a sharp edge to provide a smooth shearing action in severing said length of filter band.

8. Apparatus as defined in claim 4 wherein said means to sever said length of filter band includes stop means associated with said severing means to provide an abutment stop against which said length of filter band abuts after said predetermined length of said filter band has been advanced.

9. Apparatus as defined in claim 1 wherein said means to grip and advance said predetermined length of said filter band comprises a reciprocating slide assembly, said slide assembly including selectively actuable filter band gripping members disposed on opposite sides of said filter band to grip said filter band therebetween and means to reciprocate said slide assembly from a first position spaced from said inlet port to a second position closer to said inlet port thereby to advance said predetermined length of said filter band into said housing.

10. Apparatus as defined in claim 9 wherein said filter band gripping members are determined to contact the full lateral width of said filter band and are adapted to seal said inlet port after said predetermined length of said filter band has been advanced into said housing.

11. Apparatus as defined in claim 1 including a filter band inlet housing mounted on said housing adjacent said inlet port, said filter band inlet housing having a passage therethrough to accommodate said filter band, and said means to grip and advance said filter band being operatively associated with said inlet housing.

12. Apparatus as defined in claim 11 wherein said means to grip and advance said filter band is disposed within said filter band inlet housing and comprises, a guide plate disposed within said housing having an inclined surface inclined in the direction of filter band advance, a wedge block provided with a complimentary inclined surface adapted to reciprocably slide along said guide plate, said filter band positioned between an opposed surface of said wedge block and a second guide plate in said filter band inlet housing and means to selectively extend and retract said wedge block toward and away from said inlet port whereby said wedge block grips and advances said predetermined length of said filter band into said housing.

13. Apparatus as defined in claim 1 including means responsive to internal pressure conditions in said housing to indicate the necessity to introduce a fresh section of said filter screen within said housing.

14. A process to filter contaminants from a heat-softened material being forced to flow through a passage in a processing apparatus comprising, providing a filtering medium in the form of a band and disposing said filter band through opposed inlet and outlet ports on opposite sides of said passage in said processing apparatus so that said material is forced to flow through said filter band in said passage, providing means at said inlet port to selectively and incrementally advance a predetermined length of said filter band through said inlet port into said passage, utilizing said filter band advancing means to form a positive seal at said inlet port to preclude leakage of said material from said processing apparatus through said filter band inlet port after said filter band has been advanced, providing means at said outlet port to shear the length of filter band exiting from said processing apparatus after said filter band has been advanced by said advancing means, and including the step of utilizing said filter band shearing means to form a positive seal at said outlet port to preclude leakage of said material from said filter band outlet port after said length of filter band has been sheared.

* * * * *